No. 837,397. PATENTED DEC. 4, 1906.
W. R. GARDNER.
LIFE GUARD AND AUTOMATIC BRAKE.
APPLICATION FILED NOV. 27, 1905.
3 SHEETS—SHEET 1.
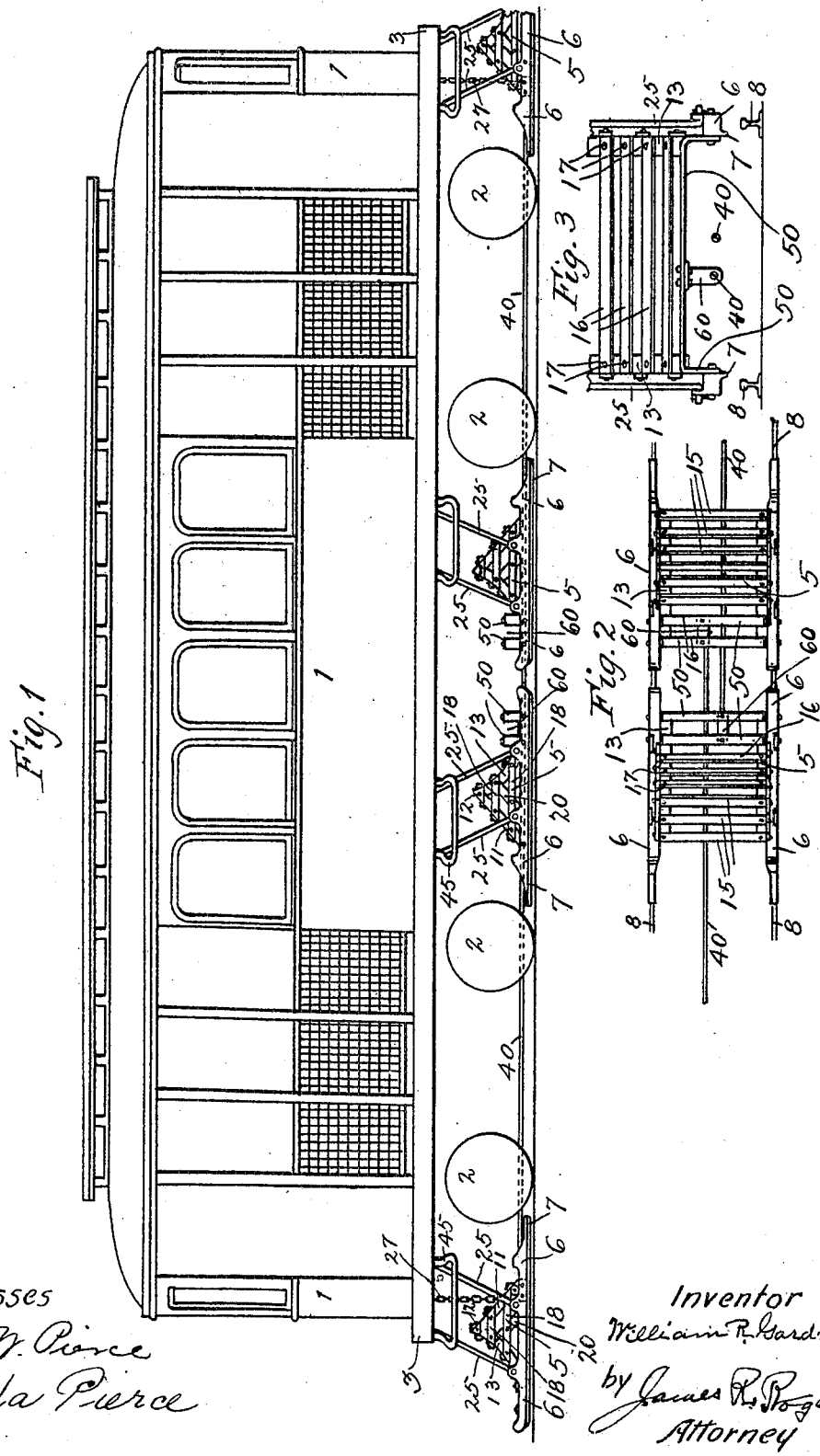
Witnesses
B. W. Pierce
Ida Pierce
Inventor
William R. Gardner
by James R. Rogers
Attorney No. 837,397.
PATENTED DEC. 4, 1906.
W. R. GARDNER.
LIFE GUARD AND AUTOMATIC BRAKE.
APPLICATION FILED NOV. 27, 1905.
3 SHEETS—SHEET 2.
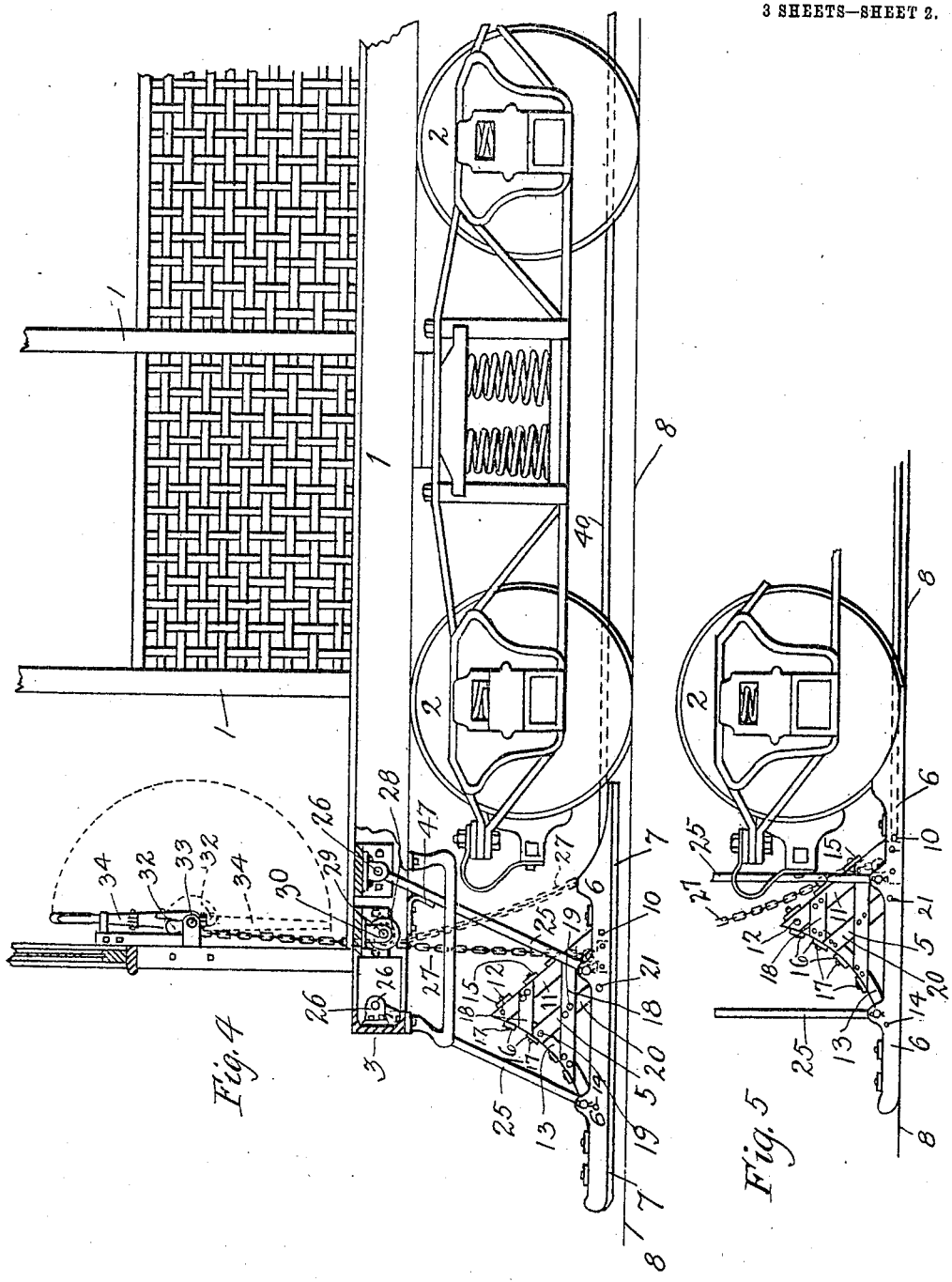
Witnesses
P. W. Pierce
Ida Pierce
Inventor
William R. Gardner
by James R. Rogers
Attorney

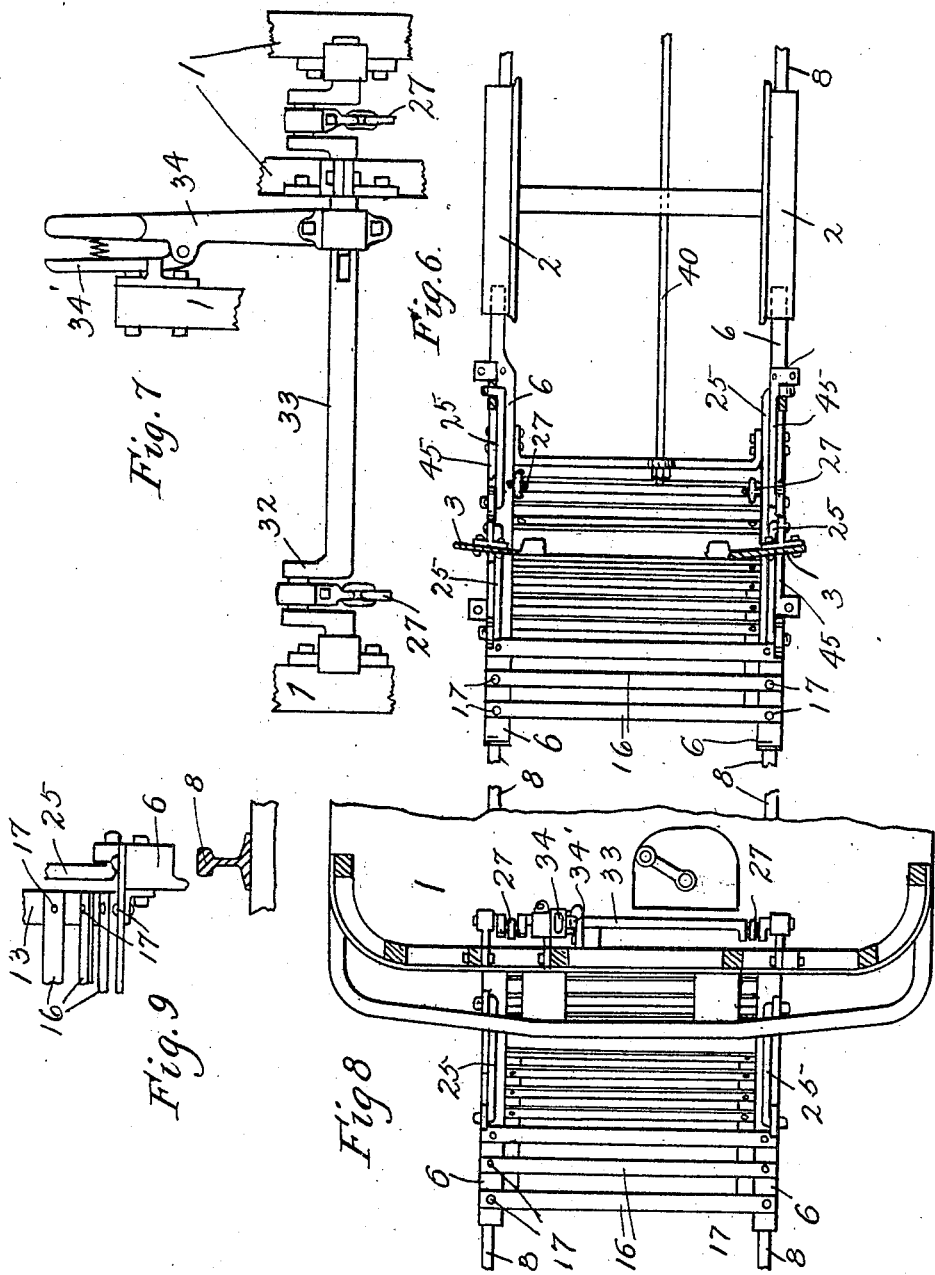

UNITED STATES PATENT OFFICE.

WILLIAM R. GARDNER, OF LOS ANGELES, CALIFORNIA.

LIFE-GUARD AND AUTOMATIC BRAKE.

No. 837,397.  Specification of Letters Patent.  Patented Dec. 4, 1906.

Application filed November 27, 1905. Serial No. 289,304.

*To all whom it may concern:*

Be it known that I, WILLIAM R. GARDNER, a citizen of the United States, residing at Los Angeles, county of Los Angeles, State of California, have invented and discovered a new and useful Improvement in Life-Guards and Automatic Brakes; and I do hereby declare the following to be a full, clear, and exact description of the invention, such as will enable others skilled in the art to which it appertains to make and use the same.

This invention relates to improvements in life-guards and automatic brakes; and the objects of my improvement are, first, to construct life-guards to be attached to cars and vehicles to prevent injury to persons and animals and to avoid damage being done to things inadvertently left upon the tracks by the moving cars and vehicles, and, second to combine with the life-guard a brake to stop cars and vehicles within the shortest possible period of time and within the shortest possible distance after the brake has been applied to the wheels of moving cars and vehicles.

The invention consists, essentially, in the construction, combination, and arrangement of the several parts, as will be hereinafter fully described in the specification, shown upon the drawings appended hereto, and specifically pointed out in the claims made a part hereof.

I attain these objects by the construction and mechanism illustrated in the accompanying drawings, in which—

Figure 1 is a view in elevation of a car with my improved life-guard and brake secured thereto. Fig. 2 is a plan view of two of my improved guards and brakes removed from the car or vehicle and portions of the rods for operating the guards and brakes secured thereto, parts thereof broken away. Fig. 3 is an end view of one of my improved guards and brakes, parts thereof broken away, and an end view of the rails of the tracks, the guard and brake elevated above the tracks. Fig. 4 is a view in elevation, on an enlarged scale, of a portion of a car, parts thereof broken away, one of the guards and brakes elevated above the rails of the track, and mechanism for raising and lowering the guard and brake. Fig. 5 is a view in elevation, on an enlarged scale, of one of my improved guards and brakes lowered upon the rails of the track and in contact with one of the wheels of the car, portions of the means for raising and lowering the guard and brake and parts of the car broken away. Fig. 6 is a plan view of portions of one of my improved guards and brakes, wheels of the car and rails of the track and rod for operating the guard and brake, all shown in said view, parts thereof broken away and parts thereof shown in section. Fig. 7 is a plan view, on an enlarged scale, of portions of the car to which my improvement is secured, parts of the car broken away, and portions of the mechanism for raising and lowering my improved guard and brake also illustrated in a like view. Fig. 8 is a plan view of one of my improved guards and brakes, a plan view of portions of the car to which my improvement is secured, parts of the car shown in section and parts thereof broken away; and Fig. 9 is a view in elevation of parts of my improved guard and brake and parts of one of the rails of the track and support for the rail also shown in elevation, parts thereof broken away.

Similar reference-numerals refer to like parts throughout the several views of the drawings.

The reference-numeral 1 denotes the car upon Figs. 1, 4, and 8 of the drawings.

The numerals 2 2 indicate the wheels of the car, and 3 3 the bumper of the car.

There are portions of the car shown upon the drawings common to all cars now in use to which no claim is made by me therein, and the description of said portions now a feature common in the construction of cars is deemed to be unnecessary, and reference-numerals are therefore omitted from the various figures illustrated upon the drawings made a part hereof.

The numerals 5 5 represent the life-guard and brake illustrated upon the various figures of the drawings, in whole or parts thereof, and the description of one of the said guards and brakes will serve as descriptive of all of them, as all are of like construction.

My improved guard and brake comprises two side pieces or runners 6 6, having flanges 7 7. (Best illustrated upon Figs. 3 and 9 of the drawings.) The said guard and brake when lowered and resting upon the rails 8 8 of the track are adapted to slide upon the top and inner surface of the rail, the said flanges 7 7 being in contact with the said surfaces of the rails 3 3, as shown upon Figs. 8 and 9 of the drawings.

Connected at the lower end by bolts, rivets 10 10, or the like to the straight side pieces or runners 6 6, about the longitudinal center thereof, are the inclined straight side supports 11 11, and these supports at their upper ends are secured, by means of bolts or rivets 12 12, to the upper end of the curved side supports 13 13, and the lower ends of the said curved side supports are fastened to the side pieces or runners 6 6 by means of bolts or rivets 14 14.

The pairs of straight supports 11 11 are held from spreading apart by means of the cross-braces 15 15, and the pairs of curved supports 13 13 are held from spreading apart by means of the cross bracing-strips 16 16, fastened at the ends thereof to the said curved supports by means of bolts, rivets, or screws 17 17.

The end braces 18 18 are secured, by means of bolts, rivets, or screws 19 19, to the straight inclined supports 11 11 at one end, and the opposite ends thereof are fastened to the curved supports 13 13.

The diagonal braces 20 20 are bolted or riveted at one end thereof to the curved supports 13 13, and the opposite end thereof to the side pieces or runners 6 6, as shown at 21 21 upon Figs. 4 and 5 of the drawings.

The guards and brakes 5 5 are swiveled upon the lower ends of the rods 25 25, as illustrated upon Figs. 4 and 5 of the drawings. The opposite ends of said rods 25 25 are swiveled in perforated brackets 26 26, secured to the bumpers 3 3 of the cars.

By means of the chain 27, fastened at one end to the guards and brakes 5 5, passing upward over the pulleys 28 28, journaled upon the pin 29 between the brackets 30 30, the opposite end of said chain being secured to the crank-arm 32, upon one end of the transverse shaft 33, operated by the hand-lever 34, (shown in full and dotted lines upon Figs. 4 and 7 of the drawings,) the guard and brake are raised and lowered. When the lever 34 is in the position shown in full line, the crank-arm pin at 32 is forward of the center of the transverse shaft 33, so that when the hand-lever is raised to nearly the upright position it will move to the final upright position quickly with a snap.

When the lever 34 is in the position shown in dotted lines upon Fig. 4 of the drawings, the chain 27 is slack and the rear ends of the side pieces or runners 6 6 are crowded under the wheels 2 2 of the car, as shown upon Fig. 5 of the drawings.

When the lever 34 is in the position shown in full lines upon Figs. 1 and 4 of the drawings the guard and brake are elevated above the rails 8 8 of the track, and the guard and brake are free from contact with the wheels 2 2 of the car, as illustrated upon said Figs. 1 and 4 of the drawings.

From the foregoing description, taken in connection with the accompanying drawings, it is thought that the construction, mode of operation, and advantages of the invention will be readily apparent without requiring an extended explanation.

By means of the rod 40, secured at the forward end thereof to the bracket 60, fastened to one of the cross bracing-strips 16, I connect the fender and brake upon the front end of the car with the fender and brake in the rear thereof, and the rear end of said rod 40 being fastened to the rear fender and brake in like manner as the forward fender and brake is fastened to the said rod.

Various changes in the form, proportion, and the minor details of construction may be resorted to without departing from the principle or sacrificing any of the advantages of this invention, and I therefore reserve to myself the right to make such changes as fairly fall within the scope thereof.

What I claim as my invention, and desire to secure by Letters Patent, is—

1. A life-guard and brake comprising side pieces, straight inclined supports, curved supports, the said inclined and curved supports secured to the side pieces or runners at the lower ends thereof and fastened together at the upper ends thereof, cross-braces fastened at the ends thereof to said supports, supporting-rods movably suspending the said side pieces from the car and means for raising and lowering the guard and brake.

2. A life-guard and brake movably supported from the car, means secured nearer the rear end of the guard and brake than the front end thereof, for lowering the guard and brake upon the rails of the track between the said rails and the wheels of the car.

3. A life-guard and brake movably suspended from the car, means fastened nearer the rear end of the guard and brake than the forward end thereof for raising the guard and brake above the rails of the track and to free the guard and brake from the wheels of the car and from the rails of the track and mechanism for lowering the guard and brake upon the said rails between the rails of the track and the wheels of the car.

4. A life-guard and brake comprising side pieces and cross-braces, the said side pieces movably suspended from the car, means secured nearer the rear end of the guard and brake than the front end thereof, the said guard and brake adapted to swing in the opposite direction from that in which the car travels when raised from the track, means for raising the guard and brake above the rails of the track and from contact with the wheels of the car and for lowering the guard and brake upon the rails of the track between said rails and the wheels of the car.

5. A life-guard and brake comprising runners having flanges on the under side thereof and a curved cut-away portion upon the upper side near the rear end thereof, inclined straight supports and cross-braces connecting said supports, curved side supports and cross-strips connecting said supports, suspending-rods connected at one end to the guard and brake and the opposite end to the car and means for raising and lowering the guard and brake secured nearer to the rear end thereof than the forward end of the guard and brake whereby the guard and brake swing forward when elevated from the track.

6. A life-guard and brake comprising straight and curved supports secured together and to the runners, runners suspended from the car and adapted to swing forward when elevated above the rails of the track and means for elevating the guard and brake connected nearer the rear end than the forward end thereof.

7. A series of life-guards and brakes comprising straight and curved portions secured together and to the runners, runners movably suspended from the car, means for connecting two or more of said guards and brakes together and means for elevating the guards and brakes connected nearer the rear ends than the forward ends thereof.

In testimony whereof I have signed my name to this specification in the presence of two subscribing witnesses.

WILLIAM R. GARDNER.

Witnesses:
JAMES R. ROGERS,
J. GAUSS.